(12) United States Patent
Zimmer et al.

(10) Patent No.: US 8,078,862 B2
(45) Date of Patent: Dec. 13, 2011

(54) METHOD FOR ASSIGNING PHYSICAL DATA ADDRESS RANGE IN MULTIPROCESSOR SYSTEM

(75) Inventors: Vincent J. Zimmer, Federal Way, WA (US); Palsamy Sakthikumar, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 828 days.

(21) Appl. No.: 12/109,387

(22) Filed: Apr. 25, 2008

(65) Prior Publication Data

US 2009/0271601 A1   Oct. 29, 2009

(51) Int. Cl.
*G06F 15/177* (2006.01)
(52) U.S. Cl. ................................. 713/2; 713/1
(58) Field of Classification Search .................... 713/1, 2
See application file for complete search history.

(56) References Cited

U.S. PATENT DOCUMENTS

| 6,158,000 | A * | 12/2000 | Collins | 713/1 |
| 6,842,857 | B2 * | 1/2005 | Lee et al. | 713/2 |
| 7,310,724 | B2 * | 12/2007 | Chen et al. | 713/1 |
| 7,779,244 | B2 * | 8/2010 | Zimmer et al. | 713/2 |
| 7,836,293 | B1 * | 11/2010 | Wynia | 713/2 |
| 2003/0120909 | A1 * | 6/2003 | Zimmer et al. | 713/2 |
| 2008/0072027 | A1 | 3/2008 | Zimmer et al. | |
| 2008/0077774 | A1 | 3/2008 | Cool et al. | |
| 2008/0147975 | A1 * | 6/2008 | Zimmer et al. | 711/120 |
| 2008/0162878 | A1 * | 7/2008 | Zimmer et al. | 712/203 |

OTHER PUBLICATIONS

U.S. Appl. No. 11/639,126, filed Dec. 13, 2006, Zimmer et al.
U.S. Appl. No. 11/647,542, filed Dec. 28, 2006, Zimmer et al.

* cited by examiner

*Primary Examiner* — Chun Cao
(74) *Attorney, Agent, or Firm* — Hanley, Flight & Zimmerman, LLC.

(57) ABSTRACT

A cache-as-RAM (CAR) system of a multi-processor system that includes a plurality of processors may be initialized. The CAR system may assign a physical data address range for each of the plurality of processors such that the physical data address ranges allocated to all of the plurality of processors overlap with each other. A boot code stream may be executed with the CAR appearing to the executing boot stream as a memory store for executing the boot code stream. Other embodiments are described and claimed.

22 Claims, 5 Drawing Sheets

-- PRIOR ART --

METHOD FOR ASSIGNING PHYSICAL DATA ADDRESS RANGE IN MULTIPROCESSOR SYSTEM

BACKGROUND OF THE INVENTION

A typical computer system may execute firmware such as a basic input/output system (BIOS) to boot up the system. More specifically, through the execution of the BIOS, the computer system may detect, test, and configure platform hardware in preparation for subsequent phases of firmware execution and the eventual launch of its operating system. The boot phase of the computer system typically involves the testing of memory, which may take a relatively long time and thus, may significantly contribute to the overall boot up time of the computer system.

For processor based systems or platforms having current and proposed initialization processes such as those provided by the Unified Extended Firmware Interface (UEFI) or other such interfaces, early platform initialization code may require access to a memory before the primary memory subsystems of the platform have been initialized.

Further, platforms having multi-processor or multi-core architectures may present unique challenges during boot up. One boot model in such multi-core or many-core systems may enable only one core and select this one core with a hardware state machine that runs at power up or a startup event to select the core. However, in such a scheme, this one core may become a single point of failure that compromises the overall reliability of the system.

Also, as instant-restart becomes an important feature in servers and other computers, taking advantage of multiple cores for a faster boot process may be attractive. It would be desirable therefore, for pre-EFI and similar initialization software to both maximally parallelize the initialization across multiple cores and be robust in the face of a failed core or errant core or a failed or malfunctioning segment of the cache associated with a core.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
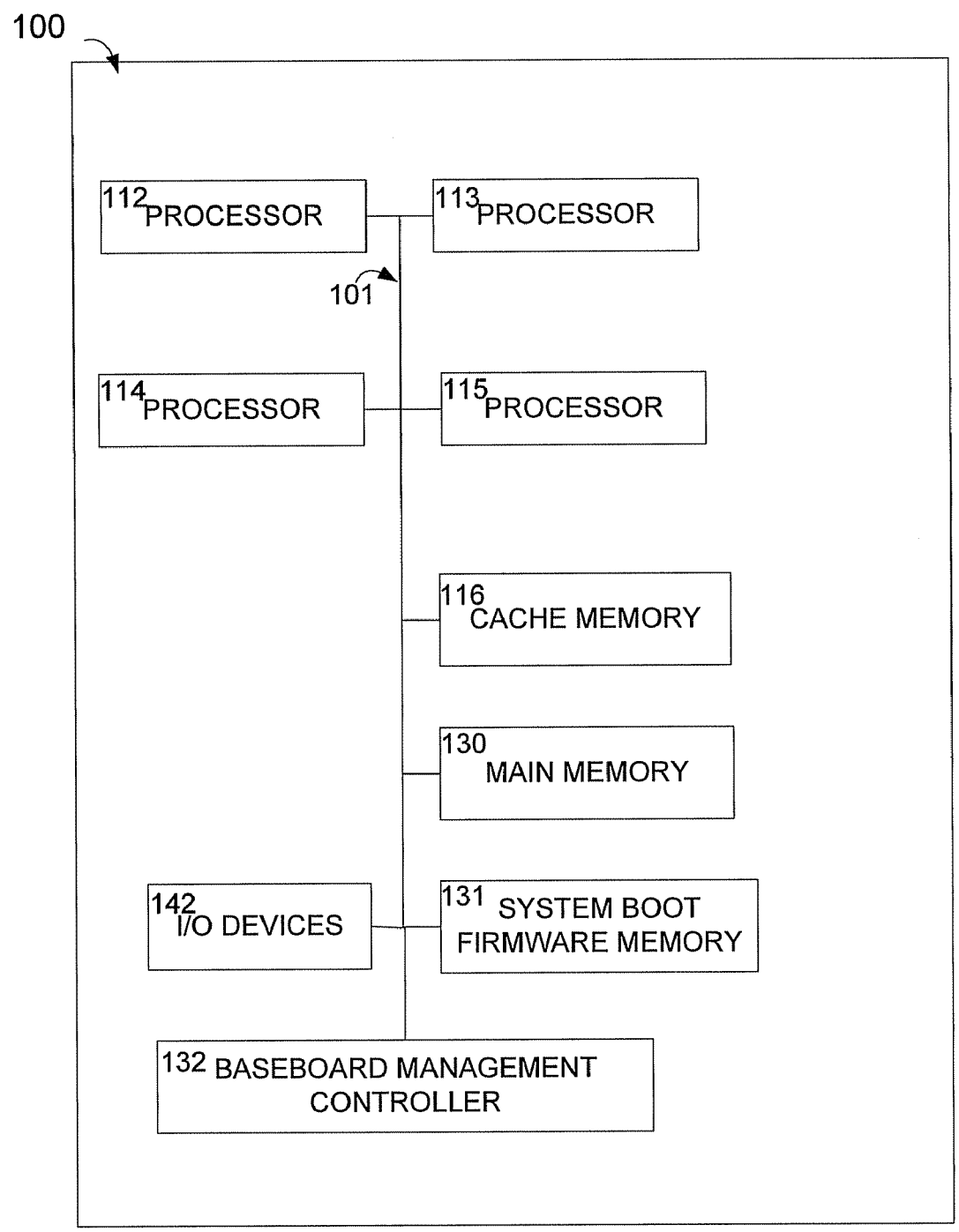
FIGS. 1 and 2 are schematic illustrations of computing systems according to embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

As used herein a logical processor may be or include a logical unit or block capable executing a stream of instructions or thread, for example as used in the IA-32 architecture by Intel Corporation and the Intel Itanium® processor family. Other suitable processors may be used. In some embodiments each logical processor may include at least a full set of data registers, segment registers, control registers, debug registers, and machine specific registers.

In some embodiments, each core of a multi-core processor or processor of a multi-processor system may have only one logical processor. Alternatively, two or more logical processors may be provided on a single core of a multi-core processor to for example allow two or more threads or processors to be executed concurrently or independently of each other. These logical processors may share some core resources of the processor such as for example an execution engine and a system bus interface. After power up and initialization, each logical processor may be independently directed to execute a specified thread, interrupted, or halted.

Embodiments of the present invention may be used in a variety of applications. Although the present invention is not limited in this respect, the circuits and techniques disclosed herein may be used in many apparatuses such as personal computers (PCs), wireless devices or stations, video or digital game devices or systems, image collection systems, processing systems, visualizing or display systems, digital display systems, communication systems, and the like.

Embodiments of the invention may provide a method, device, and system for pre-memory symmetric multiprocessing flow according to an embodiment of the invention. In one embodiment, a cache-as-RAM (CAR) system of a multi-processor system that includes a plurality of processors may be initialized. The CAR system may assign a physical data address range for each of the plurality of processors such that the physical data address ranges allocated to all of the plurality of processors overlap with each other. A boot code stream may be executed with the CAR appearing to the executing boot stream as a memory store for executing the boot code stream.

Reference is now made to FIG. 1, a schematic illustration of a computing system 100 capable of pre-memory symmetric multiprocessing (SMP) flow according to embodiments of the invention. Computing system 100 may be or include, for example, a personal computer, a desktop computer, a mobile computer, a laptop computer, a notebook computer, a terminal, a workstation, a server computer, a network device, or other suitable computing device. Although the invention is not limited in this respect, computing system 100 may be a multi-processor or multi-core system and may include a plurality of processors, for example four processors 112-115 suitable for executing programming code including Basic Input/Output System (BIOS) instructions, operating system instructions, and application code. Processors 112-115 may be logical processors as described herein and may also be referred to as cores of a multi-core processor or multi-processor system. Although the embodiment of FIG. 1 shows four cores, other numbers of cores such as for example two or eight may also be used. Computing system 100 may further include a cache memory 116, main memory 130, a system boot firmware memory 131, a baseboard management controller 132, and input/output (I/O) devices 142, all interconnected by one or more bus(es) 101. Other components or logical elements may also be included in computing system 100 such as for example a peripheral bus or input/output devices.

Processors 112-115 may be connected by bus 101 to cache memory 116 which may be a high-speed local cache memory. In some embodiments, portions of cache memory 116 may be associated or connected uniquely with each of processors 112-115 and may be level 1 caches, although the invention is not limited in this respect. Additional caches, not shown, may be used.

Main memory 130 may be or include, for example, any type of memory or memory device, such as static or dynamic random access memory or magnetic or optical disk memory. Such memory devices may include and are not limited to dual in-line memory modules (DIMMs), dynamic random access memory (DRAM), devices, synchronous dynamic random access memory (SDRAM) devices, double data rate (DDR) SDRAM devices, or other volatile or non-volatile memory devices suitable for server or general applications.

Main memory 130 may be used to store instructions to be executed by and data to be operated on by processors 112-115, or any such information in any form, such as for example operating system software, application software, or user data. In some embodiments, main memory 130 may require an initialization process at system startup or boot prior to being accessed by processors 112-115. This initialization may include for example BIOS or other instructions as stored in and loaded from for example system boot firmware memory 131. System boot firmware memory 131 may be or include, for example, any type of nonvolatile or persistent memory, such as semiconductor-based programmable read only memory or flash memory, that may be used to store any instructions or information that is to be retained while computing system 100 is not powered on.

In some embodiments, bus 101 may be or include a front side bus such as that used with for example Pentium® class microprocessors manufactured by Intel® Corporation and/or a system bus to connect components or logical elements of computing system 100 such as that used with for example Itanium Processors® manufactured by Intel®. Alternatively, bus 101 may not be a single bus connecting multiple components: a number of point-to-point (pTp) connections may connect some or all of the components of computing system 100 such as for example in a Quick Path Interconnect (QPI) system or Common System Interface (CSI) by Intel®. Other processor architectures may be used, and other methods of communicating data within a processor or among processors, cache memory 116 and main memory 130 may be used. Other numbers of processors than shown may be used, such as two or eight.

Baseboard management controller 132 may be or include a single integrated component on a motherboard, a distributed system collectively composed of multiple discrete controllers such as in for example an enterprise-class server as a monitor of different subsystems, or other components capable of managing the interface between system management software and platform management software. Baseboard management controller 132 may also provide monitoring, event logging, and/or recovery control, and may serve as the gateway between system management software and supported bus systems interconnecting platform components. In some embodiments, baseboard management controller may function as a policy agency that decides to which processor to apply power-on reset, when to initiate and terminate boot processes, and the like.

I/O devices 142 may be or include Industry Standard Architecture (ISA) devices, Peripheral Component Interconnect (PCI) devices, PCI Express devices, Universal Serial Bus (JSB) devices, Small Computer System Interface (SCSI) devices, and/or other standard or proprietary I/O devices suitable for server, personal computer, or general applications. These I/O devices 142 may be or include for example keyboard and cursor control devices, including an input unit, e.g., a keyboard, mouse, touch-pad, or other suitable pointing or input device for accepting input, alterations and/or selections, for example, from a user, audio I/O, communications devices, including modems and network interfaces, and data storage devices. Other I/O devices are also possible.

Figure 2:
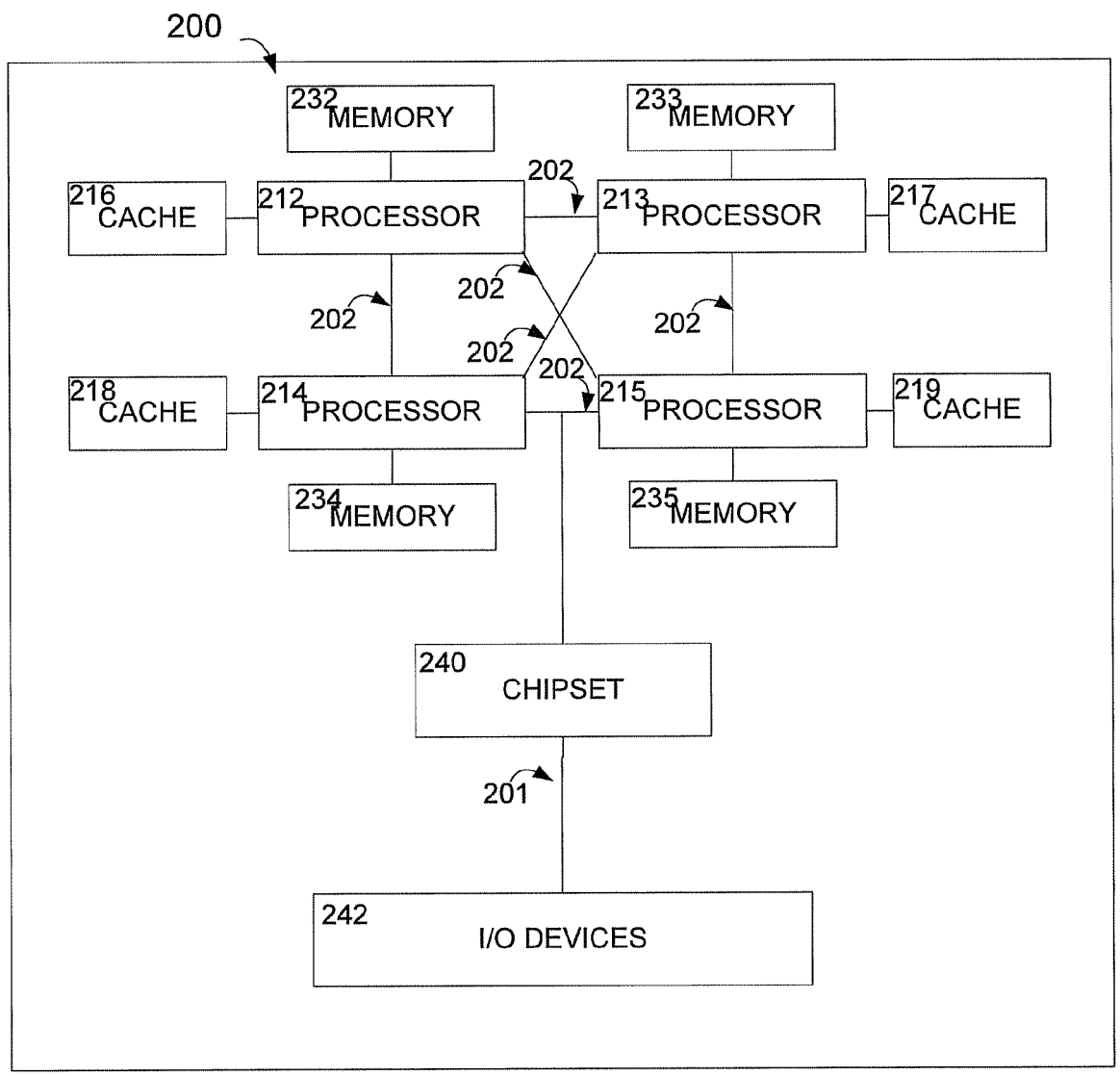

Reference is now made to FIG. 2, a schematic illustration of a computing system 200 capable of pre-memory SMP flow according to embodiments of the invention. Computing system 200 may include processors 212-215, associated caches 216-219, associated memories 232-235, a chipset 240, and input/output (I/O) devices 242, all connected by pTp connections 202 or system bus 201. In some embodiments, computing system 200 may be based on an Intel® QPI pTp architecture. Other pTp architectures may also be used. Although the invention is not limited in this respect, like named components in computing system 200 such as for example processors 212-215 and I/O devices 242 may have identical or similar functionality as their counterparts in computing system 100 (FIG. 1), e.g. processors 112-115 and I/O devices 142. However, computing system 200 may differ from computing system 100 in that the processors, memory, and possibly input/output devices in system 200 may be interconnected by a number of pTp interconnects instead of a shared bus and in that caches 216-219 may be associated respectively with processors 212-215.

A pTp interconnection network using for example pTp connections 202 may provide full connectivity in which every processor is directly connected to every other processor in the system. Alternatively, a pTp interconnection network may provide partial connectivity in which a processor reaches another processor by routing through intermediate processors. Further, a pTp interconnection network may be connected to a system bus such as system bus 201 by for example chipset 240 to provide access for exchange of data with I/O devices 242.

In some embodiments, implementations of an SMP system that utilizes pTp interconnections may be built with for example Intel processors that employ a UEFI architecture-based boot firmware. Other architectures may also be used.

In the system of FIG. 2 each of processors 212-215 may have respectively one of an associated local cache 216-219 and one of an associated memory 232-235. In some embodiments, associated memories 232-235 may constitute the main memory of computing system 200. The processors 212-215 and other components may be linked by a number of pTp connections 202. Other components such as chipset 240 and I/O devices 242 may be linked by system bus 201.

Each of processors 212-215 may be responsible for controlling the storage and retrieval of data from its own local memory 232-235. Each of processors 212-215 may also be capable of accessing other memory that it does not "own", e.g., is not associated with. For example processor 212 may be capable of accessing memory 233-235, which it does not own, as well as memory 232. Thus, in accordance with some embodiments of the invention, the computer system 200 may be a non-uniform memory access (NUMA) architecture.

In general, the NUMA architecture is a type of parallel processing architecture in which each processor has its own local memory and also can access the local memory that is owned by another processor. The "non-uniform" aspect of the NUMA architecture may refer to memory access times being faster when a processor accesses its own memory than when the processor borrows memory from another processor.

Associated memories 232-235 may be or include, for example, any type of memory or memory device, such as static or dynamic random access memory or magnetic or optical disk memory. Associated memories 232-235 may be used to store instructions to be executed by and data to be operated on by processors 212-215, or any such information in any form, such as for example operating system software, application software, or user data.

Embodiments of the invention may include a computer readable medium, such as for example a memory, a disk drive, or a universal serial bus (USB) flash memory, or the various storage and memory devices shown in FIGS. 1 and 2, including or having stored thereon instructions which when executed by a processor or controller, carry out methods disclosed herein.

To ensure cache coherency in a multi-processor system such as those shown in FIGS. 1 and 2, processors may be informed of any transactions that may alter the coherency states of the data items in their local (associated) caches. One technique to achieve cache coherency may be the implementation of a Modified/Exclusive/Shared/Invalid (MESI) protocol in which each line in a cache is marked with one of for example four states: modified by a processor (M) and exclusively owned by that processor, clean and exclusively owned by a processor (E), shared by multiple processors (S), or invalidated (I). For the MESI protocol, when a cache state is updated between two agents, e.g. local caches, a write back operation to main memory may be required. For SMP systems employing the MESI protocol, such a write back requirement may necessitate that boot operations that utilize the local caches for each processor be performed in isolation prior to initialization of main memory or that any physical address space that may be associated with each cache not overlap with the address space of another cache. These restrictions on boot operations that utilize local caches may extend the total time required for boot, in particular as the number of processors and corresponding local caches increases.

Alternatively, a Modified/Exclusive/Shared/Invalid/Forward (MESIF) protocol may be used. The MESIF protocol may be the same as the MESI protocol except that an additional forward (F) cache state may be included that indicates which processor may be responsible for a shared cache line, thereby allowing a cache line to be used by more than one cache agent without a write-back operation to main memory. Some embodiments may utilize the MESIF protocol in systems that may include for example Intel® designed processors.

Another alternative that may avoid the need for a write-back operation is a Modified/Owned/Exclusive/Shared/Invalid (MOESI) protocol. For this protocol, an owned (O) state may be added that may allow data in the main memory to become stale. Other protocols that avoid the requirement for a write-back operation to main memory for shared cache lines may also be used. Cache and memory protocols other than those listed herein may be used with embodiments of the invention.

Message exchanges among processors may be another technique for maintaining cache coherency. In some embodiments, processors may exchange snoop messages to notify other processors of memory transactions that may alter the coherency states of cached data items. A memory transaction may refer to a transaction that requires access to any memory device or any cache. In a bus connected SMP system such as that of FIG. 1, all of the other processors may snoop the common bus concurrently when a processor fetches a data item from for example a cache. In a pTp interconnection system such as that of FIG. 2, a processor may send snoop messages to all of the other processors when it performs a memory transaction. Snoop messages may be sent directly from one processor to all the other processors in a fully connected pTp interconnection network. If there is only partial connectivity, a first processor may use one or more intermediate processors as forwarding nodes in for example a fan-out mechanism that replicates and forwards the snoop message for all of the nodes in the pTp interconnection network. Other snoop or messaging protocols may be used.

Early platform initialization code may require access to a memory before the primary memory subsystems of the platform have been initialized. In one approach, such initialization code may rely upon the ability to access a processor cache or a processor cache segment associated with a processor or core of a multi-processor system as random access memory (RAM), and to use this for a stack and/or a heap as may be required by the initialization code. This technique is referred to as cache-as-RAM (CAR).

In emergent cache topologies for multi-processor systems such as SMP systems, a large cache with many cache segments may be shared among the processors for systems such as the embodiment of FIG. 1. Similarly, in systems for which each processor may have a dedicated cache, e.g. the embodiment of FIG. 2, access to these caches may also be shared. Various methods of sharing are known the art that may allow for amicable cache line sharing among a plurality of processors. However, a system that is initialized in a state where a cache to be used for CAR system initialization comes up in a shareable state may create problems for early boot flows if an MESI or similar protocol that requires a memory write-back for changing a cache line state is used. One current boot model in such SMP systems or other systems may enable only one processor and select this one processor with a hardware state machine that runs at power up or a startup event to select the processor. However, in such a scheme, this one core may become a single point of failure that compromises the overall reliability of the system. Furthermore, reliance in a single processor during some critical phases of startup may substantially increase the total time required for startup, particularly for systems with large numbers of processors or cores.

Embodiments of the present invention may alleviate these problems, although other or different benefits may be achieved. Embodiments of the invention may allow multiple caches or multiple cache segments to share a common physical address space. The incorporation of a protocol such as an MESIF or an MOESI protocol may for example preclude the need for a write-back operation to a main memory that might otherwise be required and may not be possible for such sharing during the boot phases before main memory initialization. However, such benefits need not occur with some embodiments.

Figure 3A:
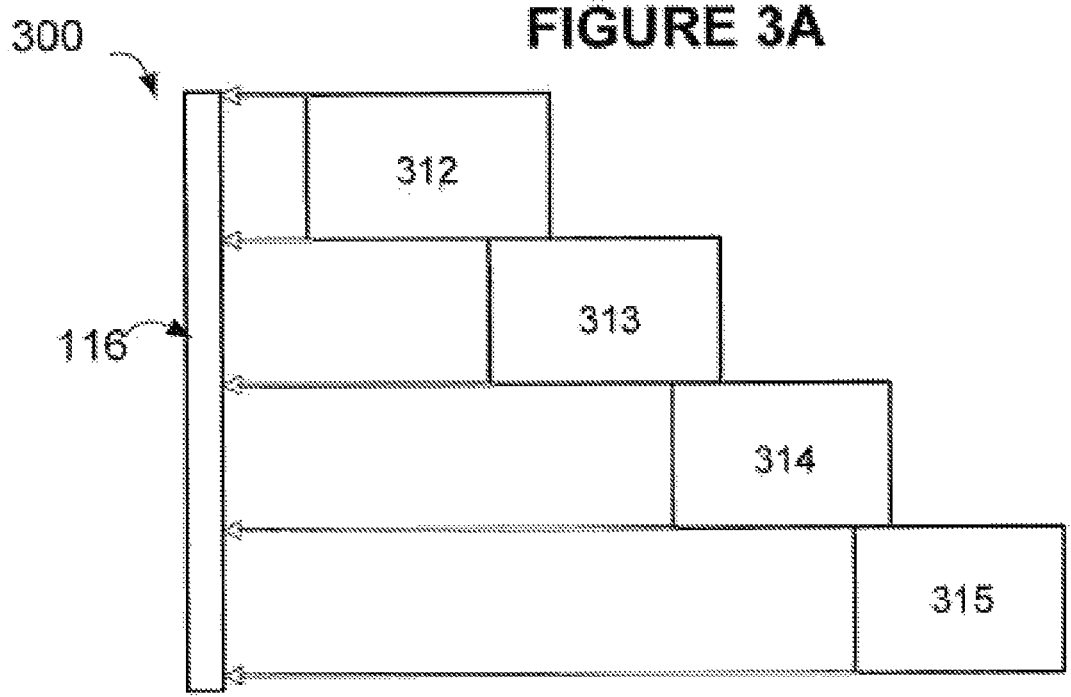
FIG. 3A is schematic illustration of a prior art physical address allocation for multiple processors during boot.
Figure 3B:
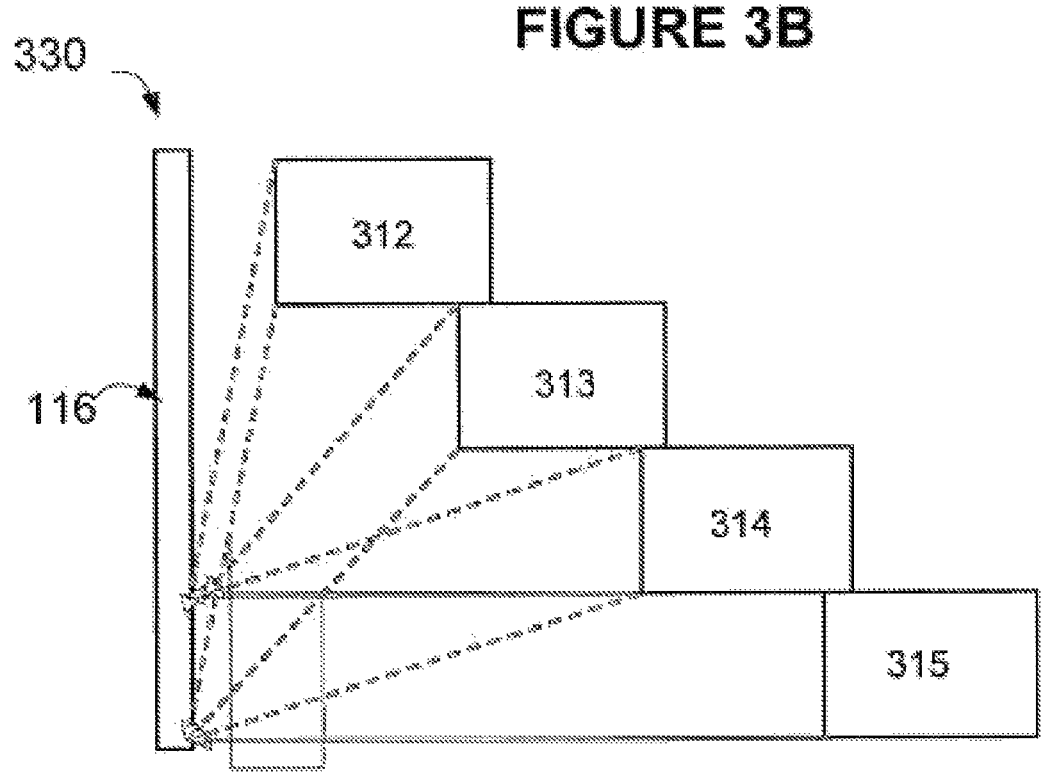
FIGS. 3B-3C are schematic illustrations of physical address allocation for multiple processors during boot according to embodiments of the invention.
Figure 3C:
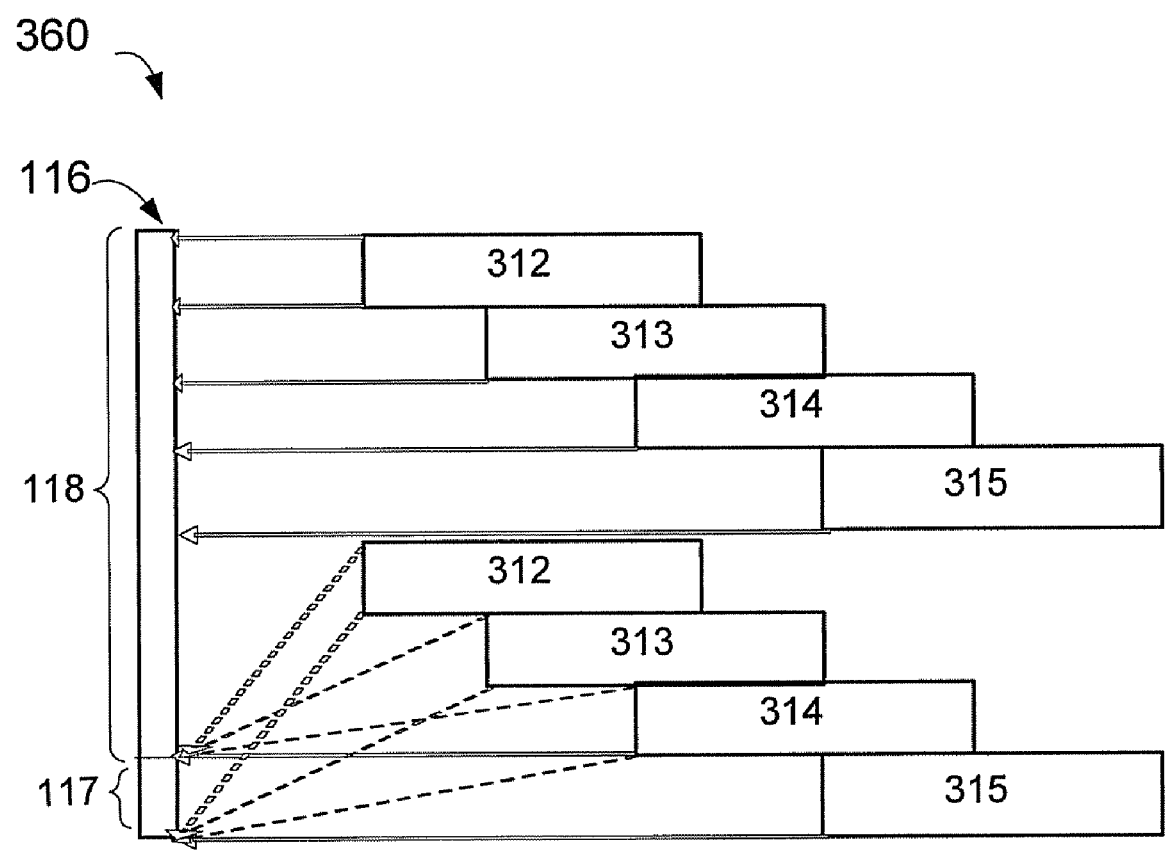

Reference is now made to FIGS. 3A-3C which show allocations of physical address space or tiles 312-315 respectively for multiple processors of a multi-processor computing platform such as for example processors 112-115 (FIG. 1) or processors 212-215 (FIG. 2) during boot. A unified cache such as cache memory 116 in the embodiment of FIG. 1 with a size of "N" bytes may be designed to have a set associativity of "X" ways where X may be the number of processors, e.g. 4 in the embodiment of FIG. 1. The cache may then be visualized as an array of "X" columns, each having a size of "N/X" bytes. For example, N may be 256 kilobytes and X may be 4 such that size of each cache may be visualized as 64 kilobytes. Other numbers of processors may be used, and additional caches, not shown, may be used.

In the illustration of FIG. 3A for physical address allocation 300, the tiles 312-315 or allocations of physical address space for each processor may be contiguous, but not overlapping. This arrangement may be viable for systems that utilize for example the MESI protocol or similar protocols because no processor can read or write to the address space assigned to another processor. However, the embodiment of FIG. 3A is not limited to use with such a protocol.

In the illustration of FIG. 3B for physical address allocation 330, the physical address spaces 312-315 assigned for the processors may be shared, e.g. the tiles accessible to each processor may overlap completely. Thus, processors such as for example processors 112-115 (FIG. 1) may share cache data when CAR is used during boot as enabled by for example the MESIF protocol or similar protocols. However, the embodiment of FIG. 3B is not limited to such a protocol.

In the illustration of FIG. 3C for physical address allocation 360, the cache allocations, e.g. tiles, of main memory 116 for each of processors 112-115 (FIG. 1) may be split between address space 117 shared by all processors and non-shared space 118, e.g. accessible only by a single processor. These address spaces may be contiguous or noncontiguous. The embodiment of FIG. 3C shows noncontiguous addressing for ease of presentation. Each processor is allocated a shared address space for which a portion of the tiles 312-315 overlap completely (address space 117) and a unique address space for which a portion of each of tiles 312-315 is not shared (address space 118), e.g. uniquely assigned to each processor. One non-limiting benefit of this addressing scheme may be that the partial overlap may allow for shared data buffers, but some unique storage per hardware thread may be lost. For example, in a system with 4 processors (N=4) with 256 kilobytes per processor of cache memory, each processor has all of the associated cache per processor as unique storage, e.g. 256 kilobytes and 4*256 kilobytes total storage for the system. If there is for example a 56 kilobyte overlap, each processor may have only 200 kilobytes and 4*200 kilobytes with 1*56 kilobytes for the system (e.g. in a system of N processors, "1" versus "N" means (N–1)*56 kilobytes less storage for total system storage) Other or different benefits may also be achieved.

For a pTp connected SMP system such as the embodiment shown in FIG. 2, the pTp architecture may allow for a large system topology and programming of routers, address decoders, etc, to aid system functionality. As such, these actions may be more computer intensive and may require more CAR-based, pre-memory firmware flows. Embodiments of the invention may enable these actions.

In the case of non-sharing cache such as in FIG. 3A, the algorithm or procedure for initialization and the state information may be local to the given processor. A typical action of this early code may be to initialize a memory controller for memory and its associated memory device, for example DRAM, on the local processor. When there is no interaction between the sockets, the local algorithm may not know the absolute location of the DRAM relative to the DRAM on other sockets (e.g., where each will live or be located in the address space). Similarly, other relative information between socket memory controllers, such as whether to interleave DRAM accesses between sockets, may not be known solely by a single processor. This relative location and interleave are parameters that may be negotiated between the processors during memory initialization. In some systems, each socket "guesses" a value and then later in the boot process fix-up, or change the programming to reflect information from the other sockets. In some embodiments of the present invention, when CAR features overlapped tiles and shared-memory buffers, these locations and interleave parameters may be shared and negotiated during CAR operations and prior to the final memory controller programming. These operations may for example save ROM space because no early, share-nothing "easy" algorithm and later, shared-data "fix-up" algorithms may be required, and boot time may be reduced because programming may be performed correctly the first time. Other or different benefits may be achieved.

Figure 4:
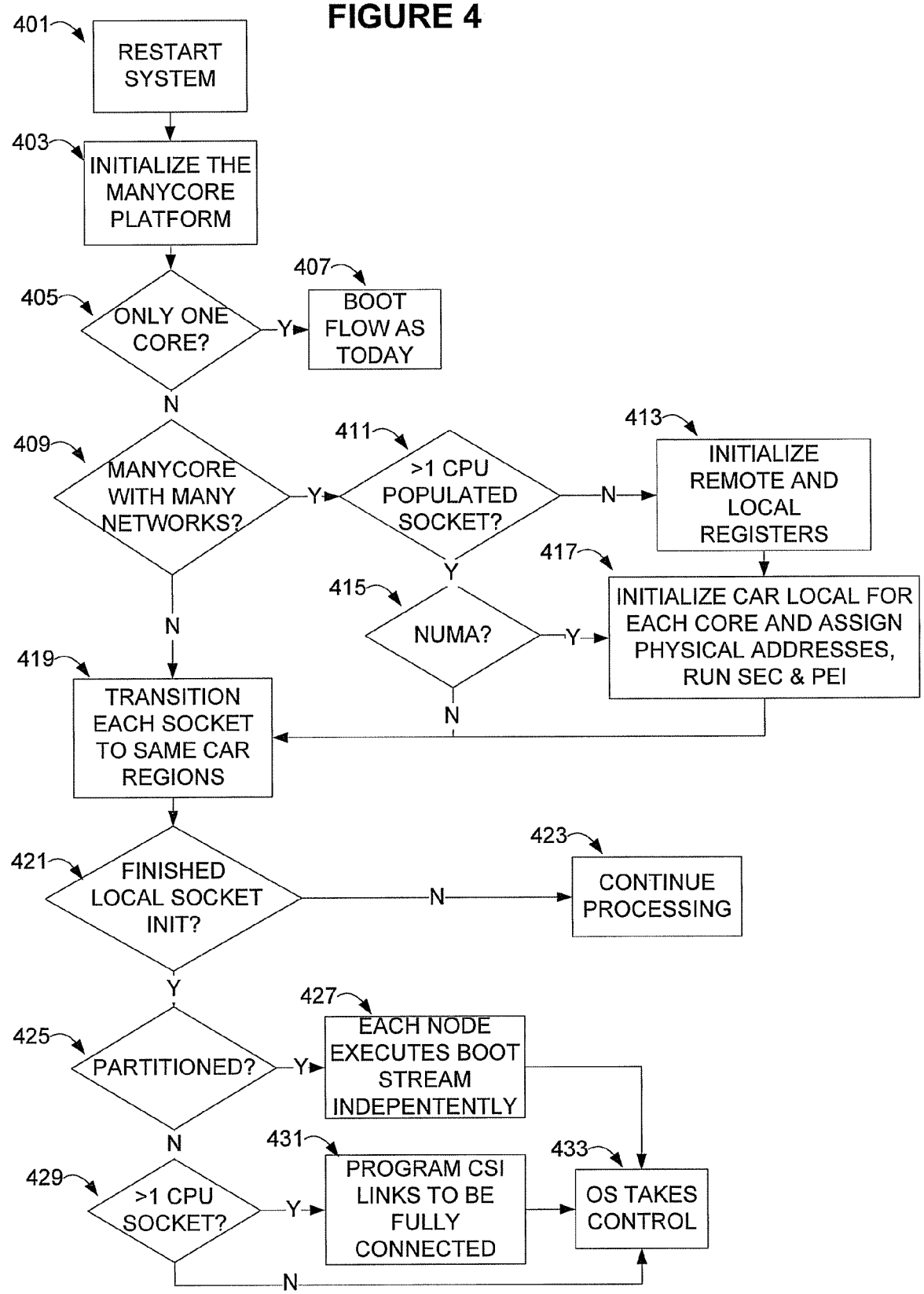
FIG. 4 is a flow chart of a method for boot phase operations in a multi-processor/manycore platform, according to an embodiment of the invention.

Reference is now made to FIG. 4 which shows a method for boot phase operations in a multi-processor/manycore platform, according to an embodiment of the invention. Embodiments of the method may be used by, or may be implemented by, for example, computing system 100 of FIG. 1, computing system 200 of FIG. 2, or other suitable systems such as SMP computing systems that incorporate multiple processors or cores and which may execute a stream of code during boot operations.

A computing system may be started or restarted in operation 401. Initialization of the platform may begin operation 403. If there is only one core in the platform, as determined in operation 405, then the boot flow may continue, e.g., serially on one processor (operation 407). If there is more than one core or processor, then it may be determined whether the platform is a manycore (multiple core or multi-processor) with many interconnects architecture, e.g., pTp architecture or multiple processors on a system bus, in operation 409. If so, then some additional memory initialization tasks may be performed.

In some embodiments, a multiple processor pTp architecture platform may have only one compute node (socket) with a processor/memory pair. Other sockets may contain only memory and an associated memory controller, but no processor. This memory may be considered "remote" to the processor in the system. Memory locally coupled to the processor in a socket may be considered "local" memory to that socket.

When a platform has only one processor, but contains sockets with only memory, as may be determined in operation 411, then the remote and local memory (registers) may be initialized by the one processor in operation 413. The processor may, using a CAR system or module, then set up a cache-as-RAM (CAR) locally for each core to access the CAR as a memory store for executing the boot code stream, e.g. the CAR may appear to or be available to the executing boot code stream as a memory store such that all data memory accesses are a hit and cause no cache evictions, and may run independent security processing (SEC) and Pre-Extended Firmware Interface Initialization (PEI) processing in operation 417. Because the CAR system is now operational, subsequent execution of boot code stream may change the states of the caches without triggering a writeback to main memory. In some embodiments, the use of a MESIF, MOESI, or similar protocol may avoid the need for such a writeback operation.

If there is more than one processor socket, then it may be determined whether Non-Uniform Memory Access (NUMA) is to be employed or whether interleaving is to be employed, in operation 415. If NUMA is employed, then the processor then may set up CAR locally for each core and may run independent SEC/PEI in operation 417.

To set CAR local, the tag for each cache line may be filled and locked such that no more dynamic updates are allowed. The CAR system may also assign a physical address range for each of the plurality of tiles associated with each of the plurality of processors such as, e.g. processors 112-115 (FIG. 1) or processors 212-215 (FIG. 2). In some embodiments, the address ranges for these tiles may overlap completely such as in the allocation for tiles 312-315 shown in FIG. 3B. Alternatively, the address ranges may overlap partially such as in the allocation for tiles 312-315 shown in FIG. 3C.

In one embodiment, memory type range registers (MTRR's) may be programmed with instructions similar to for example the following pseudo-code:

```
;
; Disable the cache
;
DISABLE_CACHE
;
; Initialize all MTRRs to a known state
;
    mov    esi, OFFSET cs:MtrrInitTable   ; Get a pointer to the table
    mov    edi, MtrrInitTableLen – 4      ; Get the total length, but
reserve the MTRR_7 to SMRR.
    xor    eax, eax                       ; Clear the low dword to write
    xor    edx, edx                       ; Clear the high dword to write
initMtrrLoop:
    movzx  ecx, WORD PTR cs:[esi]         ; Put the MTRR offset into ECX
    wrmsr
    add    esi, 2                         ; Increment to the next offset
    dec    edi                            ; Reduce the count by 1
    jnz    initMtrrLoop                   ; Until process reached the table length
```

In one embodiment, a Processor Abstraction Layer procedure (PAL_PROC) call may enable cache-as-RAM that takes the address and length as input arguments.

Processing may continue at operation 419 for all cases, where each socket may be transitioned to the same CAR region, e.g. the physical addressing space for each socket is shared. A determination may be made as to whether the local socket has finished initializing QPI or CSI memory in operation 421. If not, processing may continue until memory initialization is complete (operation 423).

Once memory has initialized, a determination may be made as to whether the platform processors are to be partitioned, in operation 425. In some embodiments, this determination and execution may be performed at the boot device select (BDS) phase, and the BDS may call EFI drivers to effect the merging or partitioning. At this point, the compute nodes may have booted and initialized independently, in parallel. If they are to be partitioned separately, then each node may be allowed to complete its boot independently, in operation 427. Once the system is fully booted, an operating system (OS) or host OS may take control in operation 433.

If partitioning is not desired, as indicated in operation 425, then in operation 429 it may be determined whether there is more than one processor in more than one socket. If not, then only one core/node/processor needs to be booted anyway, and once complete, the OS may take control in operation 433.

When there is more than one processor in more than one socket, the point-to point or CSI links may be programmed to be fully connected between nodes in operation 431. The hand-off blocks (HOBs) for each node may be merged and a common memory map is generated. Once the links and interconnects between and among all of the compute nodes and memory have been established after this point, the boot may be capable of transitioning to one processor. For these instances, the only preamble operation may be to select which processor, called the Boot Strap Processor (BSP), that may be the 1 of N processors to be the single thread of execution out of all the N to run subsequent phases of the boot firmware, such as the Driver Execution Environment (DXE) flow to complete the boot process. Once the boot is complete, the OS may take control in operation 433. It will be apparent to one of skill in the art that only partial partitioning may be desired in a platform. In this case, operations 425-427-433 and 425-429-431-433 may be somewhat merged in that partitioned nodes boot independently, but multiple nodes within a partition may require the merging of HOBs and memory maps. It will be apparent to one of skill in the art that the merging process may be altered based on platform partitioning policy.

Other operations or series of operations may be used.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
    initializing a cache-as-RAM (CAR) system in a multi-processor system, the multi-processor system including a plurality of processors, each processor associated with a memory;
    the CAR system assigning a physical data address range for each of the plurality of processors, such that the physical data address ranges allocated to the plurality of processors overlap with each other, wherein a plurality of first parts of the physical data address ranges assigned to the plurality of processors overlap completely with each other; and
    executing a boot code stream with the CAR system appearing to the executing boot stream as a memory store for executing the boot code stream.

2. The method of claim 1, wherein changes to a cache state while executing the boot code stream are made without a writeback to a main memory.

3. The method of claim 1, wherein changes to a cache state while executing the boot code stream are executed using a Modified/Exclusive/Shared/Invalid/Forward protocol.

4. The method of claim 1, wherein the physical data address ranges allocated to the plurality of processors overlap completely with each other.

5. The method of claim 1, wherein a plurality of second parts of the physical data address ranges are assigned uniquely to each of the plurality of processors.

6. The method of claim 1, wherein an interconnect of the multi-processor system comprises a point to point interconnect.

7. A device comprising:
a plurality of processors each associated with a portion of memory, one or more of the plurality of processors to initialize a cache-as-RAM (CAR) system, the CAR system to assign a tile for each of the plurality of processors such that the tiles allocated to the plurality of processors overlap with each other, wherein a plurality of first parts of the tiles allocated to the plurality of processors overlap completely with each other, and to execute a boot code stream with the CAR system appearing to the executing boot stream as a memory store for executing the boot code stream.

8. The device of claim 7, wherein changes to a cache state while executing the boot code stream are to be made without a writeback to a main memory.

9. The device of claim 7, wherein changes to a cache state while executing the boot code stream are to be executed using a Modified/Exclusive/Shared/Invalid/Forward protocol.

10. The device of claim 7, wherein the tiles allocated to the plurality of processors overlap completely with each other.

11. The device of claim 7, wherein a plurality of second parts of the tiles are assigned uniquely to each of the plurality of processors.

12. The device of claim 7, wherein an interconnect of the multi-processor system comprises a point to point interconnect.

13. A system comprising:
a plurality of processors each associated with a memory, one or more of the plurality of processors to initialize a cache-as-RAM (CAR) system, the CAR system to assign a physical data address range for each of the plurality of processors such that the physical data address ranges allocated to the plurality of processors overlap with each other, wherein a first part of the physical address ranges allocated to the plurality of processors overlap completely with each other, and to execute a boot code stream with the CAR system accessed by the executing boot stream as a memory store for executing the boot code stream; and
an interconnect network to connect the plurality of processors.

14. The system of claim 13, wherein changes to a cache state while executing the boot code stream are to be made without a write back to a main memory.

15. The system of claim 13, wherein changes to a cache state while executing the boot code stream are to be executed using a Modified/Exclusive/Shared/Invalid/Forward protocol.

16. The system of claim 13, wherein the physical data address ranges allocated to the plurality of processors overlap completely with each other.

17. The system of claim 13, wherein a plurality of second parts of the physical data address ranges are assigned uniquely to each of the plurality of processors.

18. The system of claim 13, wherein the interconnect network comprises a point to point interconnect network.

19. A tangible processor-readable storage medium having stored thereon instructions that, when executed by a machine, cause the machine to at least:
initialize a cache-as-RAM (CAR) system in a multi-processor system, the multi-processor system including a plurality of processors, each processor associated with a memory;
assign a tile for each of the plurality of processors, such that the tiles allocated to the plurality of processors overlap with each other, wherein a plurality of first parts of the tiles allocated to the plurality of processors overlap completely with each other; and
access, via a boot code stream, the CAR system as a memory store for execution.

20. The processor-readable storage medium of claim 19, further comprising instructions that, when executed by the machine, cause the machine to change to a cache state during execution of the boot code stream are to be made without a writeback to a main memory.

21. The processor-readable storage medium of claim 19, further comprising instructions that, when executed by the machine, cause the machine to allocate the tiles to the plurality of processors to overlap completely with each other.

22. The processor-readable storage medium of claim 19, further comprising instructions that, when executed by the machine, cause the machine to assign a plurality of second parts of the tiles uniquely to each processor of the plurality of processors.

* * * * *